United States Patent
Kudou et al.

(10) Patent No.: US 10,111,056 B2
(45) Date of Patent: Oct. 23, 2018

(54) SERVER AND COMMUNICATION METHOD THEREOF

(71) Applicant: NEC Corporation, Minato-ku, Tokyo (JP)

(72) Inventors: Masato Kudou, Tokyo (JP); Yoshinori Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 15/023,450

(22) PCT Filed: Dec. 1, 2014

(86) PCT No.: PCT/JP2014/005992
§ 371 (c)(1),
(2) Date: Mar. 21, 2016

(87) PCT Pub. No.: WO2015/092989
PCT Pub. Date: Jun. 25, 2015

(65) Prior Publication Data
US 2016/0212599 A1 Jul. 21, 2016

(30) Foreign Application Priority Data

Dec. 16, 2013 (JP) ................................. 2013-259212

(51) Int. Cl.
*H04W 40/20* (2009.01)
*H04W 84/18* (2009.01)
(Continued)

(52) U.S. Cl.
CPC ............. *H04W 4/12* (2013.01); *H04W 40/20* (2013.01); *H04W 84/12* (2013.01); *H04W 84/18* (2013.01); *H04W 84/22* (2013.01)

(58) Field of Classification Search
None
See application file for complete search history.

(56) References Cited

U.S. PATENT DOCUMENTS 7,433,691 B1   10/2008   White
8,660,526 B1 *  2/2014   Heiderscheit ..... H04M 1/72572
                                                    455/404.2
(Continued)

FOREIGN PATENT DOCUMENTS

EP           1566930 B1      4/2008
EP           2434805 A1      3/2012
(Continued)

OTHER PUBLICATIONS

Extended European Search Report for EP Application No. EP14870986.8 dated Jul. 11, 2017.
(Continued)

*Primary Examiner* — Duc T Duong

(57) ABSTRACT

A server (1) receives a first message indicating that a final destination is a first mobile node. Next, the server (1) determines, from among a plurality of gateways (21 to 24) that provide connectivity with a network infrastructure (5) to a plurality of wireless ad-hoc networks (41 to 46), a first gateway to which the first message is to be transferred, based on a movement history of the first mobile node. Then, the server (1) attempts to transmit the first message to the first mobile node through the determined first gateway. It is thus possible to contribute, for example, to an improvement of probability of delivering messages addressed to mobile nodes within a wireless ad-hoc network.

27 Claims, 6 Drawing Sheets

(51) Int. Cl.
*H04W 4/12* (2009.01)
*H04W 84/12* (2009.01)
*H04W 84/22* (2009.01)

(56) References Cited

U.S. PATENT DOCUMENTS

| | | | |
|---|---|---|---|
| 2003/0053424 A1* | 3/2003 | Krishnamurthy | H04B 7/18563 370/316 |
| 2005/0185606 A1* | 8/2005 | Rayment | H04W 8/082 370/328 |
| 2005/0190717 A1 | 9/2005 | Shu et al. | |
| 2008/0095163 A1* | 4/2008 | Chen | H04L 45/16 370/392 |
| 2010/0254309 A1* | 10/2010 | Mankins | H04L 45/52 370/328 |
| 2011/0164562 A1* | 7/2011 | Qiu | H04W 72/1236 370/328 |
| 2014/0089912 A1* | 3/2014 | Wang | G06F 8/65 717/173 |
| 2014/0328338 A1* | 11/2014 | Ueda | H04W 40/246 370/338 |
| 2015/0004974 A1* | 1/2015 | Karimi-Cherkandi | H04W 48/16 455/435.2 |

FOREIGN PATENT DOCUMENTS

| | | |
|---|---|---|
| JP | 2004-180024 A | 6/2004 |
| JP | 2012-095235 A | 5/2012 |
| JP | 2012-253450 A | 12/2012 |
| WO | 2004/114703 A1 | 12/2004 |
| WO | 2009/078427 A1 | 6/2009 |
| WO | 2011/071045 A1 | 6/2011 |
| WO | 2013/040970 A1 | 3/2013 |
| WO | 2013/076912 A1 | 5/2013 |

OTHER PUBLICATIONS

Taiwanese Office Action for TW Application No. 103143190 dated Feb. 13, 2017.
International Search Report for PCT Application No. PCT/JP2014/005992, dated Feb. 24, 2015.

* cited by examiner

SERVER AND COMMUNICATION METHOD THEREOF

This application is a National Stage Entry of PCT/JP2014/005992 filed on Dec. 1, 2014, which claims priority from Japanese Patent Application 2013-259212 filed on Dec. 16, 2013, the contents of all of which are incorporated herein by reference, in their entirety.

TECHNICAL FIELD

This application relates to a wireless ad-hoc network, and in particular to relaying messages between wireless ad-hoc networks located apart from each other.

BACKGROUND ART

A disruption tolerant network is a wireless multi-hop network including a plurality of communication nodes. A disruption tolerant network can be called a delay tolerant network or a disconnect tolerant network. In the specification of the present application, disruption/delay/disconnect tolerant networks are collectively referred to as "DTNs". In a DTN, a number of communication nodes (hereinafter referred to as "DTN nodes") autonomously relay a message (data bundle or data packet), thereby achieving the delivery of the message from a source node to a destination node. One or both of the source node and the destination node may belong to the DTN (i.e., DTN node), or belong to an external network (e.g., the Internet, a public cellular network, or a wireless Local Area Network (LAN)). When one or both of the source node and the destination node belong to an external network, at least one of the DTN nodes serves as a router that relays messages between the DTN and the external network.

The DTN is based on the premise that temporary or intermittent loss of communications could occur due to movement of DTN nodes, blocking of radio signals caused by obstacles, or the like. In other words, the DTN is based on the premise that there is no stable communication path between the source node and the destination node at least at some point in time. To cope with temporary or intermittent loss of communications, each DTN node performs a store-and-forward operation. Accordingly, the DTN can also be called a store-and-forward type wireless multi-hop network. Some or all DTN nodes constituting a DTN may be mobile nodes having mobility. In this regard, the DTN can also be called a store-and-forward type wireless ad-hoc network. It has been assumed that DTNs may be used for emergency communications during a disaster, and for vehicle-to-vehicle communications and road-to-vehicle communications in Intelligent Transport Systems (ITS).

Patent Literature 1 discloses an improvement in message delivery between DTN nodes. Patent Literature 2 discloses an improvement in routing in a DTN.

CITATION LIST

Patent Literature

[Patent Literature 1] International Application Publication No. WO 2011/071045

[Patent Literature 2] International Application Publication No. WO 2013/076912

SUMMARY OF INVENTION

Technical Problem

The inventors of the present application have examined the use of a message relay server to relay messages between wireless ad-hoc networks that are physically apart from each other, or to relay messages between a wireless ad-hoc network and an external network such as the Internet. The wireless ad-hoc network referred herein includes the DTN. As described above, the DTN can be regarded as a wireless ad-hoc network that uses a store-and-forward operation to cope with temporary or intermittent loss of communications.

In order to deliver a message to a mobile node within a wireless ad-hoc network, a message relay server (hereinafter simply called "server") has to select a node to which the message is transferred or a transfer path of the message. However, since the mobile node within the wireless ad-hoc network has mobility, it is very difficult to continuously keep track of the current location of the mobile node. In the DTN, in particular, continuous communication is not ensured, and the DTN is based on the premise that temporary or intermittent loss of communications could occur. In other words, at the point when the server transmits the message, the presence of an end-to-end communication path through which the message can be delivered to the destination mobile node is not ensured. The server has to attempt to transmit the message to the mobile node to which no end-to-end continuous communication path exists. Accordingly, the server cannot keep track of the current location of the mobile node prior to the transmission of the message.

Note that cellular networks such as a Universal Mobile Telecommunications System (UMTS) and an Evolved Packet System (EPS) use paging. That is, a mobility management node in a core network (e.g., a Serving GPRS Support Node (SGSN) and a Mobility Management Entity (MME)) continuously tracks locations of mobile nodes on a location-registration-area level. This location registration area is called "routing area", "tracking area", or the like. To enable this mobility management, a mobile node in an idle mode periodically or aperiodically sends messages for updating its location registration area (e.g., Tracking Area Update messages) to the mobility management node. When a message that is to be transmitted to a mobile node arises, the mobility management node transmits a paging signal from all the base stations located in the current location registration area of the mobile node. Then, the mobility management node detects the current location of the mobile node on a base-station level by receiving a response sent from the mobile node that has received the paging signal, and after that sends the message to the mobile node.

It is very difficult to apply this paging mechanism of cellular networks to wireless ad-hoc networks, because continuous tracking of locations of mobile nodes cannot be performed in wireless ad-hoc networks such as a DTN. In contrast to this, a cellular network, which performs continuous tracking of locations of mobile nodes, pages a mobile node whose EPS Mobility Management (EMM) state is an EMM-Registered state and then sends the message to the mobile node. However, the cellular network does not provide any mechanism for sending a message to a mobile node whose location is not managed, for example, a mobile node whose EPS Mobility Management (EMM) state is an EMM-DEREGISTERED state. That is, transmission of a message to a mobile node within a wireless ad-hoc network such as a DTN corresponds to transmission of a message to a mobile node whose location is not managed.

The present invention has been made based on the above-described examination by the inventors. It is an object of the present invention to provide a server, a communication method, and a program which are capable of contributing to an improvement of probability of delivering messages addressed to mobile nodes within a wireless ad-hoc network.

Solution to Problem

In a first aspect, a server includes a relay processing unit and a communication interface. The relay processing unit is configured to relay a message addressed to a mobile node within a wireless ad-hoc network. The communication interface is configured to communicate with a plurality of gateways through a network infrastructure. Each of the plurality of gateways provides connectivity with the network infrastructure to at least one of a plurality of wireless ad-hoc networks. The relay processing unit is further configured to (a) receive a first message indicating that a final destination is a first mobile node, (b) determine, from among the plurality of gateways, a first gateway to which the first message is to be transferred, based on a movement history of the first mobile node, and (c) attempt to transmit the first message to the first mobile node through the first gateway.

In a second aspect, a communication method, performed by a server that relays a message addressed to a mobile node within a wireless ad-hoc network, includes: (a) receiving a first message indicating that a final destination is a first mobile node; (b) determining, from among a plurality of gateways that provide connectivity with a network infrastructure to a plurality of wireless ad-hoc networks, a first gateway to which the first message is to be transferred, based on a movement history of the first mobile node; and (c) attempting to transmit the first message to the first mobile node through the first gateway.

In a third aspect, a program includes instructions for causing a computer to perform a method performed by a server that relays a message addressed to a mobile node within a wireless ad-hoc network. The method includes: (a) identifying a first mobile node designated as a final destination of a first message; and (b) determining, from among a plurality of gateways that provide connectivity with a network infrastructure to a plurality of wireless ad-hoc networks, a first gateway to which the first message is to be transferred, based on a movement history of the first mobile node.

Advantageous Effects of Invention

According to aspects stated above, it is possible to provide a server, a communication method, and a program which are capable of contributing to an improvement of probability of delivering messages addressed to mobile nodes within a wireless ad-hoc network.

DESCRIPTION OF EMBODIMENTS

Figure 1:
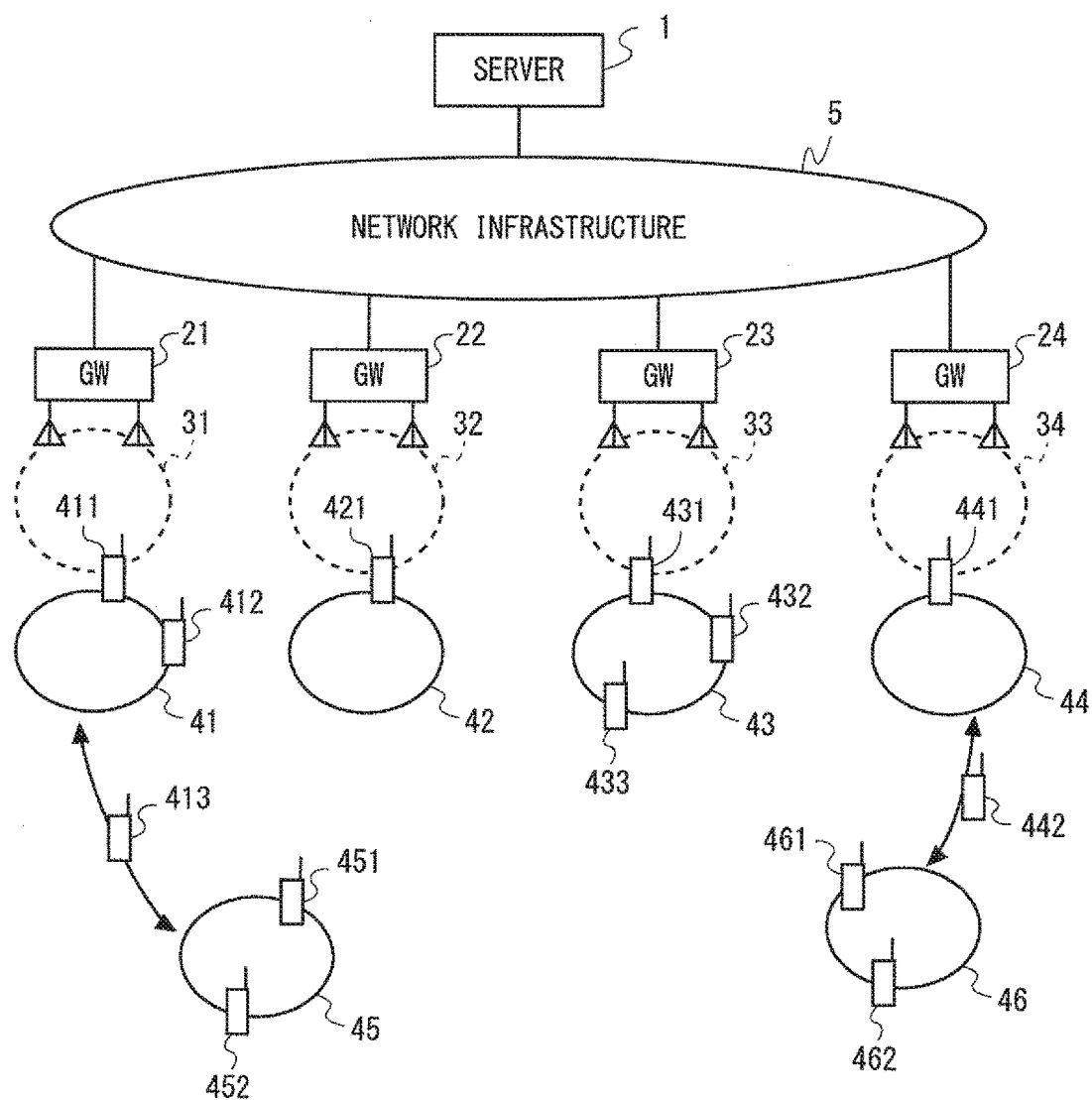
FIG. 1 shows a configuration example of a network according to a first exemplary embodiment.

Specific exemplary embodiments are explained hereinafter in detail with reference to the drawings. The same reference numerals are assigned to the same or corresponding elements throughout the drawings, and duplicated explanation is omitted as necessary.

First Exemplary Embodiment

FIG. 1 shows a configuration example of a network according to this exemplary embodiment. A server 1 relays a message addressed to mobile nodes each belonging to any one of a plurality of wireless ad-hoc networks 41 to 46. The message relayed by the server 1 may be a message originating from a mobile node (transmitted by a mobile node) or may be a message originating from other networks (e.g., the Internet).

The server 1 can communicate with gateways 21 to 24 through a network infrastructure 5. The network infrastructure 5 provides more continuous communication than the wireless ad-hoc networks 41 to 46 do. The network infrastructure 5 includes, for example, the Internet, a public cellular network, or a public wireless LAN.

The gateways 21 to 24 provide connectivity with the network infrastructure 5 to the wireless ad-hoc networks 41 to 46. Each of the gateways 21 to 24 is, for example, (a) a wireless LAN access point, (b) a mobile node that has both a wireless ad-hoc function and a wireless LAN connection function and serves as a mobile router, or (c) a mobile node that has both a wireless ad-hoc function and a public cellular network connection function and serves as a mobile router. In the example shown in FIG. 1, each of the gateways 21 to 24 is a wireless LAN access point, and forms a wireless LAN (WLAN) coverage.

Each of the wireless ad-hoc networks 41 to 46 includes one or more mobile nodes. In the example shown in FIG. 1, the wireless ad-hoc network 41 includes three mobile nodes 411 to 413, the wireless ad-hoc network 42 includes one mobile node 421, the wireless ad-hoc network 43 includes three mobile nodes 431 to 433, the wireless ad-hoc network 44 includes two mobile nodes 441 and 442, the wireless ad-hoc network 45 includes two mobile nodes 451 and 452, and the wireless ad-hoc network 46 includes two mobile nodes 461 and 462. These mobile nodes autonomously relay messages to each other, thereby achieving delivery of the messages (data bundles or data packets) between a source node and a destination node. One or both of the source node and the destination node may belong to the wireless ad-hoc networks 41 to 46 or belong to other networks. The other networks include, for example, at least one of the Internet, a public cellular network, and a public wireless LAN.

Note that FIG. 1 is merely a snapshot showing a momentary state of the wireless ad-hoc networks 41 to 46. The number of mobile nodes within each wireless ad-hoc network changes with time. A wireless ad-hoc network may be divided or disappear as a result of the movement of mobile nodes. Two or more wireless ad-hoc networks may merge into one wireless ad-hoc network. Further, two or more mobile nodes may encounter and contact each other, thus forming a new wireless ad-hoc network which is not shown in FIG. 1.

At least one of the wireless ad-hoc networks 41 to 46 may be a DTN. In the example shown in FIG. 1, each of the mobile nodes belonging to the wireless ad-hoc networks 41, 44, 45 and 46 behaves as a DTN node and performs a store-and-forward operation. For example, the mobile node 413 stores, in its data buffer, a message which has been received from the mobile node 411 or 412 in the wireless ad-hoc network 41, and then transmits the message stored in the data buffer according to a routing protocol (e.g., an Epidemic approach or a Spray and Wait approach) when communication with the mobile nodes 451 and 452 in the wireless ad-hoc network 45 is available.

Each mobile node shown in FIG. 1 also communicates with the server 1 in order to deliver a message between wireless ad-hoc networks. Specifically, a message originating from one of the mobile nodes is transferred to the server 1 through the mobile node 411, 421, 431 or 441 having connectivity with any one of the gateways 21 to 24. Similarly, a message addressed to one of the mobile nodes is transferred from the server 1 through the mobile node 411, 421, 431 or 441 having connectivity with any one of the gateways 21 to 24.

Needless to say, the network configuration shown in FIG. 1 is merely an example. The number of gateways is not limited to four as shown in FIG. 1, and may be any number equal to or greater than two. Further, the number of mobile nodes and the number of wireless ad-hoc networks are also not limited to the numbers shown in FIG. 1.

Next, an operation for selecting a gateway performed by the server 1 is explained hereinafter with reference to FIGS. 2 to 4. In response to receiving a message indicating that the final destination is a node B (e.g., mobile node 452), the server 1 determines, from among the plurality of gateways 21 to 24, the gateway to which this message is to be transferred, based on a movement history of the node B (node 452). Then, the server 1 attempts to transmit the message to the node B through the determined gateway.

In some implementations, the movement history of the destination node B (node 452) may indicate a path(s) through which a message(s) originating from the node B (node 452) and arriving at the server 1 has passed. The path, through which a message originating from the node B has passed, may be represented by an Internet Protocol (IP) address of one of the gateways 21 to 24 or a network address of one of the wireless LAN coverages 31 to 34. In this case, the server 1 may select a gateway included in the path through which a message originating from the node B has passed.

The server 1 may determine the gateway to which the message destined for the node B is to be transferred, based on a relation between a current time, a current day of the week, or a current date and that when a message from the node B has passed through one or some of the gateways. For example, when it is inferred, based on the movement history, that the node B often uses a specific gateway (i.e., messages originating from the node B often pass through a specific gateway) in a specific time or specific day of the week, the server 1 may select that specific gateway to transmit a message to the node B in that specific time or specific day of the week.

The server 1 may determine the gateway to which the message destined for the node B is to be transferred, based on a behavior pattern of the node B inferred from the movement history of the node B. For example, when it is inferred based on the movement history that the node B frequently moves between two or more gateways, the server 1 may preferentially select these gateways.

In some implementations, the movement history of the destination node B (node 452) may indicate a geographical location(s) of the node B (node 452) in the past. For example, the geographical location of the node B may be represented by location information acquired by using a Global Positioning System (GPS) receiver disposed in the node B (node 452). In this case, the node B (node 452) may periodically or aperiodically report its own location information to the server 1 through the wireless ad-hoc networks 41 to 46. The server 1 may select an appropriate gateway (e.g., a gateway geographically close to the node B (node 452)) by comparing the geographical location of the node B (node 452) with the geographical locations of the plurality of gateways 21 to 24.

Figure 2:
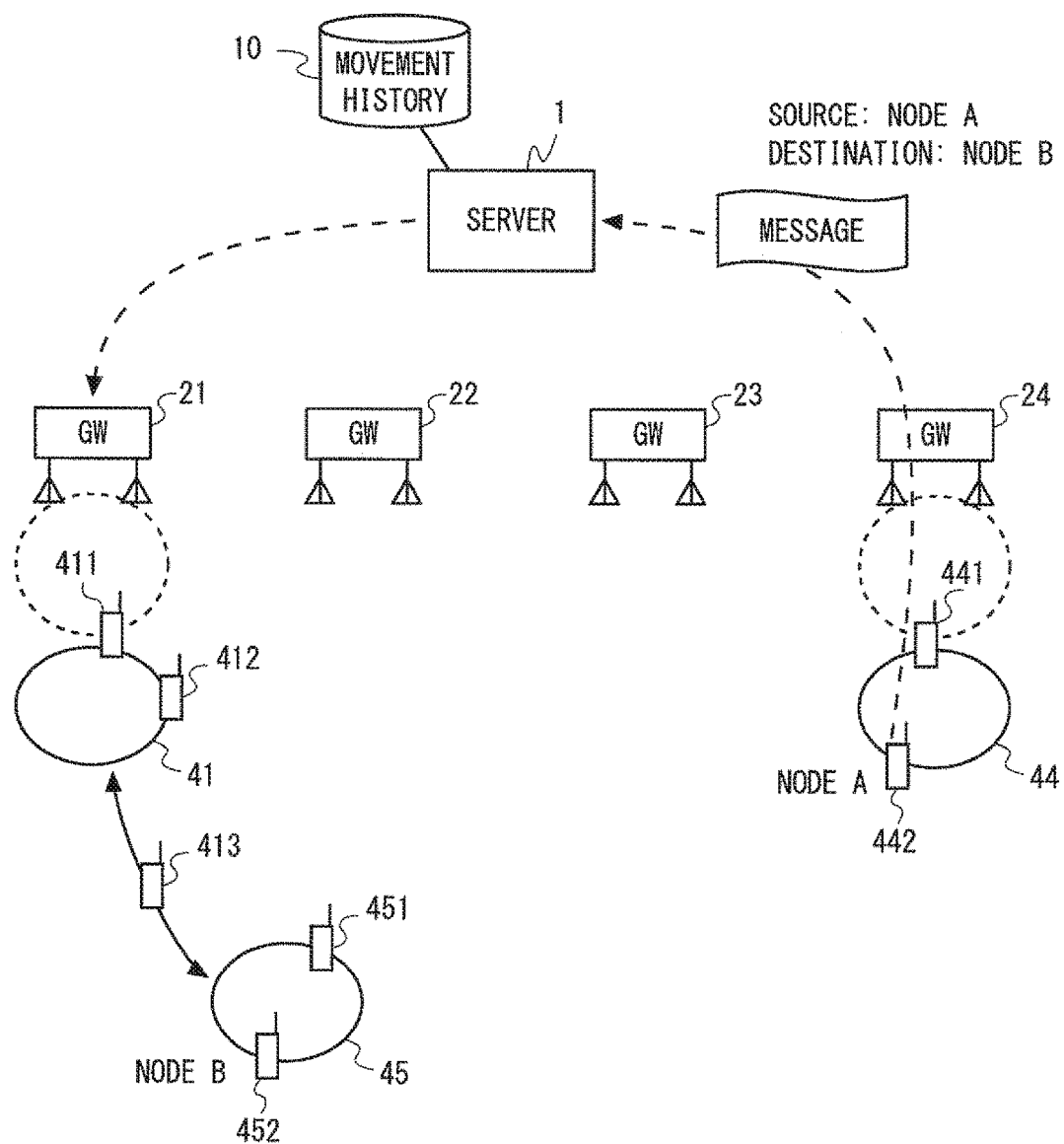
FIG. 2 is a conceptual diagram for explaining an operation for selecting a gateway performed by a server according to the first exemplary embodiment.

FIG. 2 is a conceptual diagram showing an operation for selecting a gateway performed by the server 1. In the example shown in FIG. 2, the server 1 receives a message originating from a node A (mobile node 442 in this example). Next, the server 1 checks the header of the message and identifies that the final destination of the message is the node B (mobile node 452 in this example). Next, the server 1 accesses a movement history database 10 and acquires a movement history of the node B (mobile node 452). Further, the server 1 determines the gateway (gateway 21 in this example) based on the movement history of the node B (mobile node 452). Then, the server 1 attempts to transmit the message to the node B (mobile node 452) through the determined gateway (gateway 21). Note that FIG. 2 shows an example in which the message is transmitted between mobile nodes. However, the message that is to be transmitted to the node B (node 452) may arrive at the server 1 from other networks (e.g., the Internet).

Figure 3:
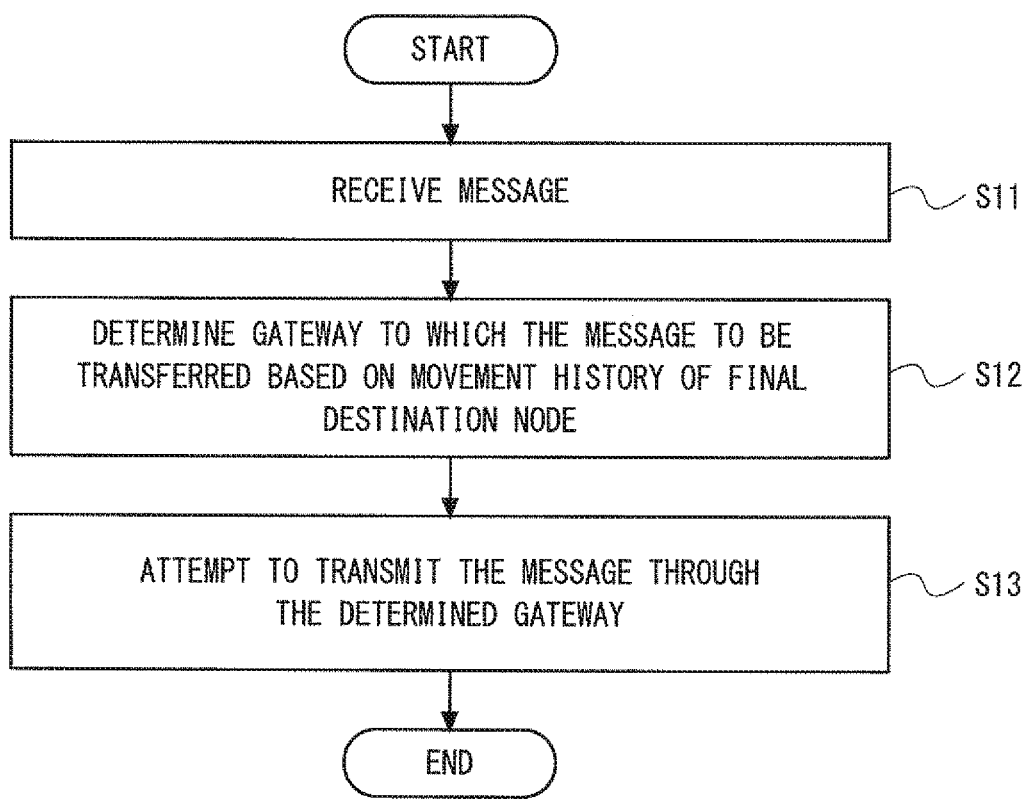
FIG. 3 is a flowchart showing an example of an operation for selecting a gateway performed by a server according to the first exemplary embodiment.

FIG. 3 is a flowchart showing an example of an operation for selecting a gateway performed by the server 1. In a step S11, the server 1 receives a message. In a step S12, the server 1 determines the gateway to which the message received in the step S11 is to be transferred, based on a movement history of the final destination node of the received message. In a step S13, the server 1 attempts to transmit the message through the gateway determined in the step S12.

Figure 4:
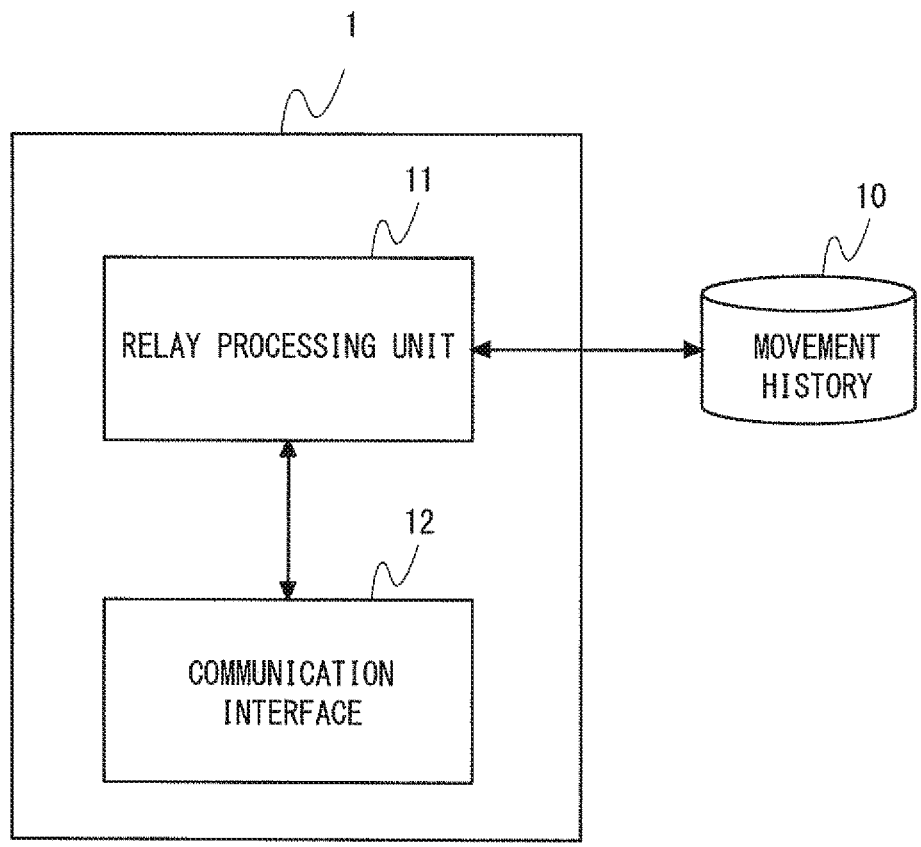
FIG. 4 is a block diagram showing a configuration example of a server according to the first exemplary embodiment.

FIG. 4 is a block diagram showing a configuration example of the server 1. A relay processing unit 11 is configured to relay a message addressed to a mobile node within a wireless ad-hoc network. The relay processing unit 11 also performs the above-described gateway selection. A communication interface 12 can communicate with the plurality of gateways 21 to 24 through the network infrastructure 5.

As can be understood from the above explanation, the server 1 according to this exemplary embodiment operates to receive a message addressed to a mobile node (node B in this example) within a wireless ad-hoc network, and determine the gateway to which the message is to be transferred from among the plurality of gateways 21 to 24 based on the movement history of the node B. The server 1 also operates to attempt to transmit the message to the node B through the determined gateway. As a result, the server 1 can effectively determine the gateway to which the message is to be transferred, thereby contributing to the improvement of actual probability of delivering messages addressed to mobile nodes within the wireless ad-hoc network.

Second Exemplary Embodiment

In this exemplary embodiment, a modified example of the above-described first exemplary embodiment is described. The overall configuration of a network according to this exemplary embodiment is similar to the configuration example shown in FIG. 1. The configuration example of the server 1 according to this exemplary embodiment is similar to that shown in FIG. 4.

The server 1 according to this exemplary embodiment performs an operation for selecting a gateway and attempts to transmit a message through the selected gateway as explained above in the first exemplary embodiment. However, in a wireless ad-hoc network, the state of the network dynamically changes depending on movement of mobile nodes within the wireless ad-hoc network and depending on division or disappearance of the wireless ad-hoc network. Accordingly, an attempt of the server 1 to transmit a message does not always succeed. In particular, in the case of the DTN, a movement history of a mobile node obtained by the server could be quite old. This is because in the DTN in which delays are allowed, it may take a long time before a message or location information originating from a mobile node arrives at the server 1. Accordingly, in this case, success rate of message transmission could decrease even further.

Figure 5:
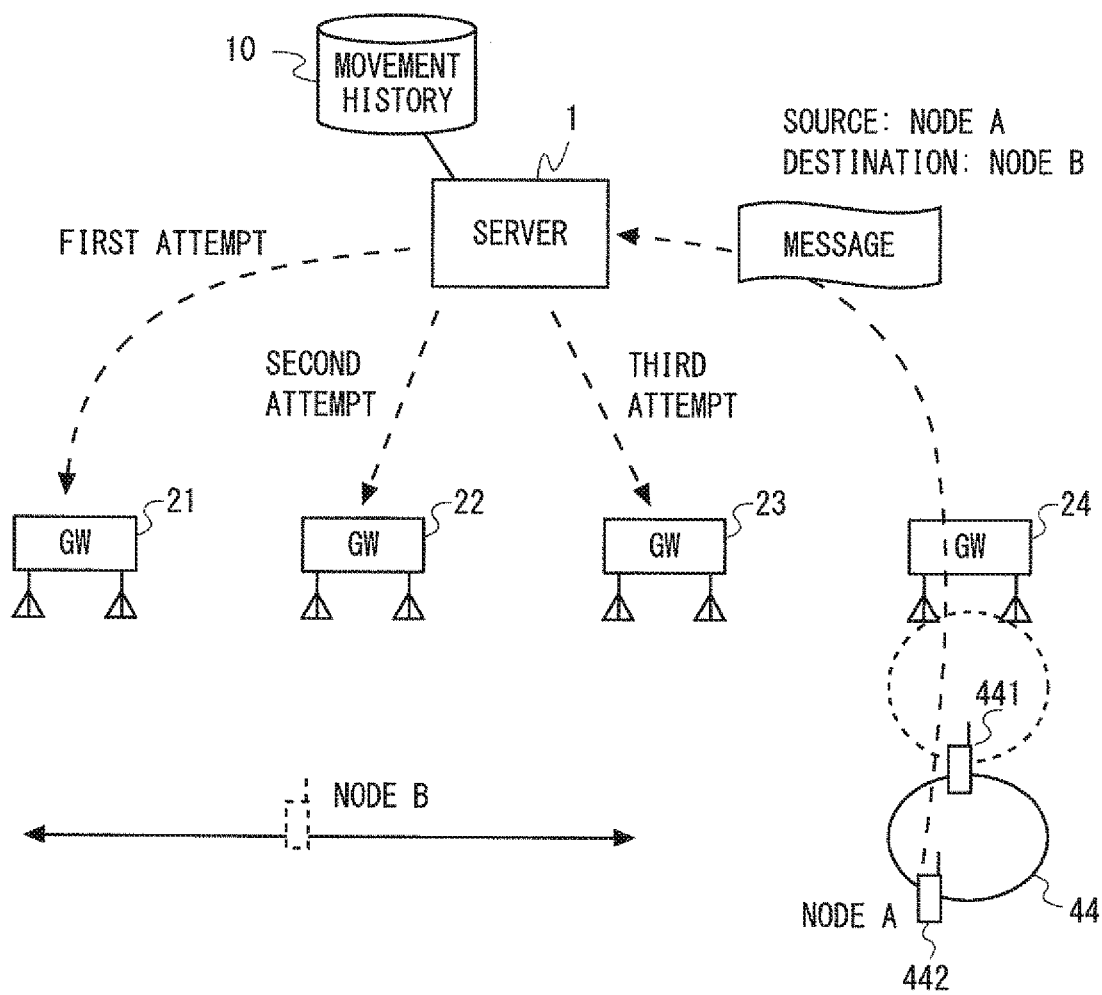
FIG. 5 is a conceptual diagram for explaining an operation for selecting a gateway performed by a server according to a second exemplary embodiment.

Accordingly, in this exemplary embodiment, when a message transmission attempt ends in failure, the server 1 selects a next gateway and attempts the message transmission again through the newly selected gateway. The server 1 may attempt the message transmission by using different gateways in descending order of their arrival probabilities, starting from a gateway having the highest arrival probability, based on the movement history of the destination node. In the example shown in FIG. 5, the server 1 accesses the movement history database 10 and refers to the movement history of the mobile node B, and determines, for each gateway, the arrival probability to the node B under the condition that the message is transmitted through that gateway based on the movement history of the mobile node B. Then, the server 1 attempts to transmit the message addressed to the mobile node B in the order of the gateways 21, 22 and 23.

The arrival probability to the mobile node B for each gateway may be determined based on the movement history of the mobile node B. As an example, assume a case in which the movement history indicates a path through which a message originating from the mobile node B and arriving at the server 1 has passed. In this case, the server 1 may evaluates the arrival probabilities to the mobile node B of the gateways in such a manner that arrival probability to the mobile node B of a gateway becomes higher as a time period or the number of times at which that gateway provides connectivity to the mobile node B increases. As another example, when the movement history indicates a geographical location of the mobile node B in the past, the server 1 may determine the arrival probabilities to the mobile node B of the gateways in such a manner that arrival probability to the mobile node B of a gateway becomes higher as the time during which the mobile node B is geographically located close to that gateway increases.

Figure 6:
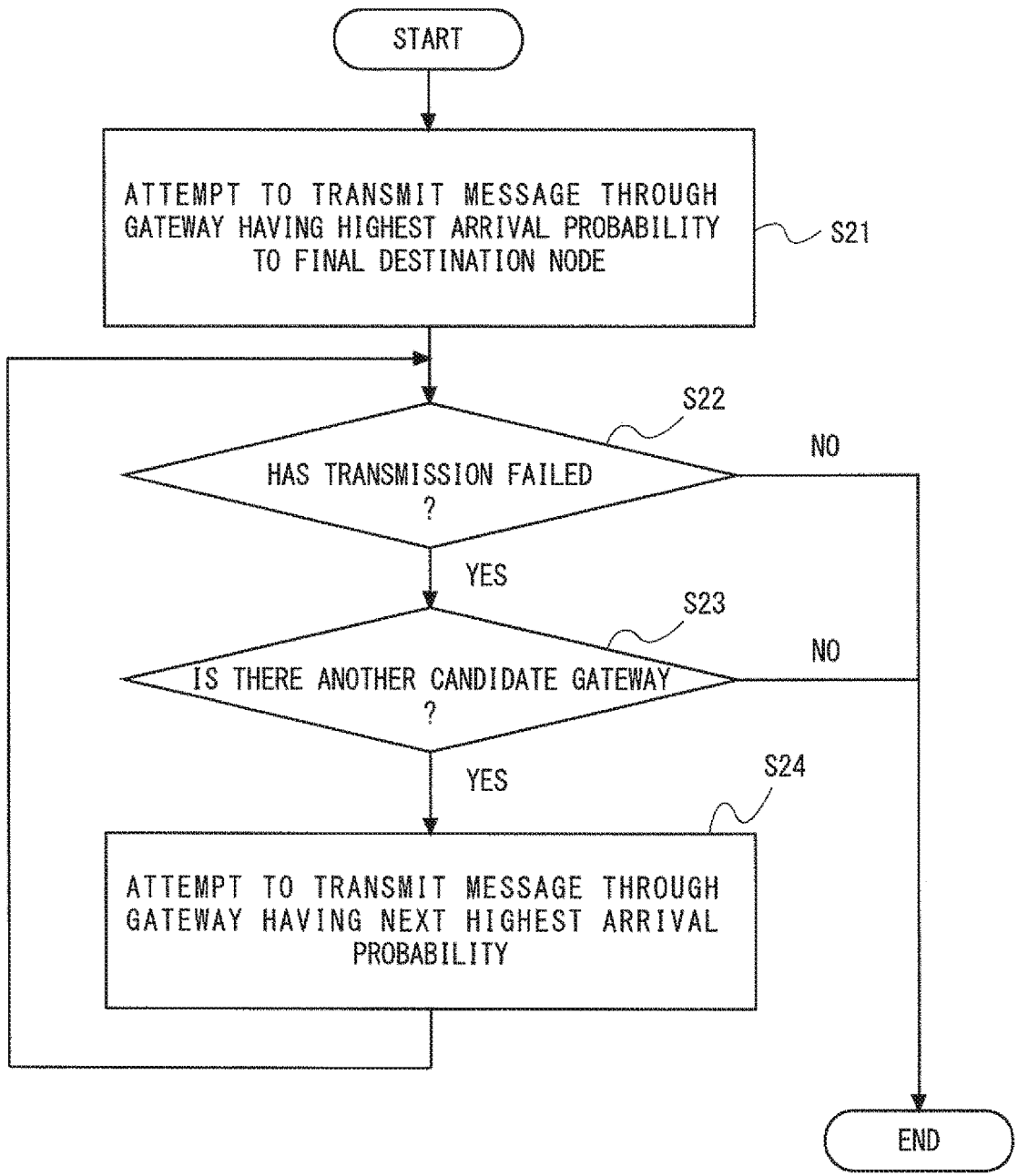
FIG. 6 is a flowchart showing an example of an operation for selecting a gateway performed by a server according to the second exemplary embodiment.

FIG. 6 is a flowchart showing an example of an operation for selecting a gateway performed by the server 1 according to this exemplary embodiment. In a step S21, the server 1 attempts to transmit a message through a gateway having the highest arrival probability to the final destination node B. In a step S22, the server 1 determines whether the attempt in the step S21 has failed or not. When the attempt in the step S21 has failed (Yes at step S22), the server 1 determines whether or not there is another candidate gateway (step S23). When there is one or more candidate gateways (Yes at step S23), the server 1 attempts to transmit the message through a gateway having the next highest arrival probability (step S24). The server 1 repeats the operations in the steps S22 to S24 until the message transmission succeeds or all the candidate gateways are used.

As can be understood from the above explanation, the server 1 according to this exemplary embodiment attempts to transmit a message by using different gateways in descending order of their arrival probabilities based on the movement history of the destination node for the message. As a result, the arrival probability of messages can be improved.

Further, in this exemplary embodiment, the server 1 may adjust the ratio of the number of transmission attempts of the message among a plurality of gateways based on the movement history of the destination node for the message. Specifically, the server 1 may increase the number of transmission attempts for a gateway that has been determined to have a high message arrival probability based on the movement history compared to the number of transmission attempts for other gateways having relatively low arrival probabilities. In consideration of mobility of mobile nodes within wireless ad-hoc networks and DTNs, there is a possibility that a desirable result cannot be obtained when the message transmission attempt is made only once. This is because there is a possibility that the attempt might be made when the mobile node happens to be temporarily moved away from the gateway, or the attempt might be made when the communication path happens to be temporarily disconnected. Accordingly, it is considered that the arrival probability to the destination node can be improved by repeating transmission attempts for the same gateway. In particular, it is possible to efficiently improve the actual message arrival probability by repeatedly attempting the message transmission through the gateway having relatively higher arrival probability than other gateways.

In some implementations, the server 1 may adjust, based on the movement history of the destination node for the message, a maximum retention time (hereinafter called "cache validity period") of the message stored in a memory included in the server 1. Specifically, the server 1 may increase the cache validity period for a store-and-forward operation when the destination node has frequently gone back and forth between the gateways (e.g., the gateway 21-24). By increasing the cache validity period, the arrival probability of messages can be improved.

Other Exemplary Embodiments

In the above-described first or second exemplary embodiment, the server 1 (relay processing unit 11) may exchange movement histories of nodes with other servers. In other words, the server 1 may send movement histories of nodes obtained by the server 1, and receive movement histories of nodes obtained by other servers. Then, the server 1 may determine, from among a plurality of gateways, a gateway to which the message to the node B is to be transferred, upon consideration being given to the movement history of the node B received from other servers. The operation for exchanging a movement history of a node with other serves may be performed periodically, or may be performed aperiodically when the arrival probability to the node B is expected to be low. By using movement histories of nodes obtained by other servers, the arrival probability of messages can be improved and the number of transmission attempts can be reduced.

The above-described exemplary embodiments may be combined with one another and simultaneously implemented as desired.

The gateway determination process performed by the server 1 explained above in the above-described exemplary embodiments may be implemented by causing a computer system to execute a program. Specifically, one or more programs including instructions for causing a computer system to perform an algorithm explained above with reference to the flowcharts may be created, and the created programs may be supplied to the computer system.

These programs can be stored and provided to a computer using any type of non-transitory computer readable media. Non-transitory computer readable media includes any type of tangible storage media. Examples of non-transitory computer readable media include a magnetic recording medium (e.g. a flexible disk, a magnetic tape, and a hard disk drive), a magneto-optic recording medium (e.g. a magneto-optic disk), a Compact Disc Read Only Memory (CD-ROM), a CD-R, and a CD-R/W, and a semiconductor memory (e.g. a mask ROM, a Programmable ROM (PROM), an Erasable PROM (EPROM), a flash ROM, and a Random Access Memory (RAM)). The programs may be provided to a computer by using any type of transitory computer readable media. Examples of transitory computer readable media include an electrical signal, an optical signal, and an electromagnetic wave. Transitory computer readable media can provide the programs to a computer through a wired communication line, such as electric wires and optical fibers, or wireless communication line.

The above-described exemplary embodiments are mere examples of the application of the technical idea obtained by the inventors of the present application. That is, the technical idea is not limited to the above-described exemplary embodiments and various modifications can be made thereto.

This application is based upon and claims the benefit of priority from Japanese Patent Application No. 2013-259212, filed on Dec. 16, 2013, and the disclosure of which is incorporated herein in its entirety by reference.

REFERENCE SIGNS LIST

1 SERVER
10 MOVEMENT HISTORY DATABASE
11 RELAY PROCESSING UNIT
12 COMMUNICATION INTERFACE
5 NETWORK INFRASTRUCTURE
21-24 GATEWAYS
31-34 WIRELESS LOCAL AREA NETWORK (WLAN) COVERAGES
41-44 WIRELESS AD-HOC NETWORKS
411-413, 421, 431-433, 441-442, 451-452, 461-462 MOBILE NODES

What is claimed is:
1. A server comprising:
at least one hardware processor configured to relay a message addressed to a mobile node within a wireless ad-hoc network; and
a communication interface capable of communicating with a plurality of gateways through a network infrastructure, each of the plurality of gateways configured to provide, to at least one of a plurality of wireless ad-hoc networks, connectivity with the network infrastructure, wherein
the at least one hardware processor is configured to:
receive a first message indicating that a final destination is a first mobile node,
determine, from among the plurality of gateways, a first gateway to which the first message is to be transferred, based on a movement history of the first mobile node,
attempt to transmit the first message to the first mobile node through the first gateway;
in response to a failure of transmission of the first message through the first gateway, determine, from among the plurality of gateways, a second gateway to which the first message is to be transferred; and
adjust, based on the movement history, a ratio between the number of transmission attempts of the first message through the first gateway and the number of transmission attempts of the first message through the second gateway.

2. The server according to claim 1, wherein
the movement history indicates a path through which a message originating from the first mobile node and arriving at the server has passed, and
the server is configured to determine a gateway included in the path as the first gateway.

3. The server according to claim 2, wherein the at least one hardware processor is configured to determine the first gateway based on a behavior pattern of the first mobile node inferred from the movement history.

4. The server according to claim 1, wherein
the movement history indicates a geographical location of the first mobile node in the past, and
the at least one hardware processor is configured to determine the first gateway by comparing the geographical location of the first mobile node with geographical locations of the plurality of gateways.

5. The server according to claim 1, wherein the at least one hardware processor is configured to increase the number of transmission attempts through the first gateway compared to the number of transmission attempts through the second gateway, as a time period or the number of times at which the first gateway provides connectivity to the first mobile node increases compared to a time period or the number of times at which the second gateway provides connectivity to the first mobile node.

6. The server according to claim 1, wherein the at least one hardware processor is further configured to adjust, based on frequency of movement of the first mobile node inferred from the movement history, a maximum retention time of the first message stored in the server.

7. The server according to claim 1, wherein the at least one hardware processor is configured to exchange the movement history of the first mobile node with another server.

8. The server according to claim 7, wherein the at least one hardware processor is configured to determine the first gateway upon consideration being given to the movement history of the first mobile node received from the another server.

9. The server according to claim 1, wherein at least one of the plurality of gateways is a wireless Local Area Network (LAN) access point.

10. The server according to claim 1, wherein the network infrastructure is configured to provide more continuous communication than the plurality of wireless ad-hoc network do.

11. A server, comprising:
at least one hardware processor configured to relay a message addressed to a mobile node within a wireless ad-hoc network; and
a communication interface capable of communicating with a plurality of gateways through a network infrastructure, wherein
each of the plurality of gateways provides, to at least one of a plurality of wireless ad-hoc networks, connectivity with the network infrastructure, each of the plurality of gateways configured to provide, to at least one of a plurality of wireless ad-hoc networks, connectivity with the network infrastructure, wherein
the at least one hardware processor is configured to:
receive a first message indicating that a final destination is a first mobile node,
determine, from among the plurality of gateways, a first gateway to which the first message is to be transferred, based on a movement history of the first mobile node, and
attempt to transmit the first message to the first mobile node through the first gateway,
the movement history indicates a path through which a message originating from the first mobile node and arriving at the server has passed, and
the at least one hardware processor is configured to determine a gateway included in the path as the first gateway, and
the at least one hardware processor is configured to determine the first gateway based on a relation between a current time, a current day of the week, or a current date and that when the message originating from the first mobile node has been passed through one or some of the plurality of gateways.

12. A communication method performed by a server that relays a message addressed to a mobile node within a wireless ad-hoc network, the method comprising:
receiving a first message indicating that a final destination is a first mobile node;
determining, from among a plurality of gateways that provide connectivity with a network infrastructure to a plurality of wireless ad-hoc networks, a first gateway to which the first message is to be transferred, based on a movement history of the first mobile node;
attempting to transmit the first message to the first mobile node through the first gateway;
determining, from among the plurality of gateways, a second gateway to which the first message is to be transferred, in response to a failure of transmission of the first message through the first gateway; and
adjusting, based on the movement history, a ratio between the number of transmission attempts of the first message through the first gateway and the number of transmission attempts of the first message through the second gateway.

13. The communication method according to claim 12, wherein
the movement history indicates a path through which a message originating from the first mobile node and arriving at the server has passed, and
the determining comprises determining a gateway included in the path as the first gateway.

14. The communication method according to claim 13, wherein the determining comprises determining the first gateway based on a behavior pattern of the first mobile node inferred from the movement history.

15. The communication method according to claim 12, wherein
the movement history indicates a geographical location of the first mobile node in the past, and
the determining comprises determining the first gateway by comparing the geographical location of the first mobile node with geographical locations of the plurality of gateways.

16. The communication method according to claim 12, wherein the adjusting comprises increasing the number of transmission attempts through the first gateway compared to the number of transmission attempts through the second gateway, as a time period or the number of times at which the first gateway provides connectivity to the first mobile node increases compared to a time period or the number of times at which the second gateway provides connectivity to the first mobile node.

17. The communication method according to claim 12, further comprising exchanging the movement history of the first mobile node with another server.

18. The communication method according to claim 17, wherein the determining comprises determining the first gateway upon consideration being given to the movement history of the first mobile node received from the another server.

19. A communication method performed by a server that relays a message addressed to a mobile node within a wireless ad-hoc network, the method comprising:
receiving a first message indicating that a final destination is a first mobile node;
determining, from among a plurality of gateways that provide connectivity with a network infrastructure to a plurality of wireless ad-hoc networks, a first gateway to which the first message is to be transferred, based on a movement history of the first mobile node; and
attempting to transmit the first message to the first mobile node through the first gateway, wherein
the movement history indicates a path through which a message originating from the first mobile node and arriving at the server has passed,
the determining comprises determining a gateway included in the path as the first gateway, and
the determining comprises determining the first gateway based on a relation between a current time, a current day of the week, or a current date and that when the message originating from the first mobile node has passed through one or some of the plurality of gateways.

20. A non-transitory computer readable medium storing a program for causing a computer to perform a method performed by a server that relays a message addressed to a mobile node within a wireless ad-hoc network, the method comprising:
identifying a first mobile node designated as a final destination of a first message;
determining, from among a plurality of gateways that provide connectivity with a network infrastructure to a plurality of wireless ad-hoc networks, a first gateway to which the first message is to be transferred, based on a movement history of the first mobile node;
determining, from among the plurality of gateways, a second gateway to which the first message is to be transferred from, in response to a failure of transmission of the first message through the first gateway; and
adjusting, based on the movement history, a ratio between the number of transmission attempts of the first message through the first gateway and the number of transmission attempts of the first message through the second gateway.

21. The non-transitory computer readable medium according to claim 20, wherein
the movement history indicates a path through which a message originating from the first mobile node and arriving at the server has passed, and
the determining comprises determining a gateway included in the path as the first gateway.

22. The non-transitory computer readable medium according to claim 21, wherein the determining comprises determining the first gateway based on a behavior pattern of the first mobile node inferred from the movement history.

23. The non-transitory computer readable medium according to claim 20, wherein
the movement history indicates a geographical location of the first mobile node in the past, and
the determining comprises determining the first gateway by comparing the geographical location of the first mobile node with geographical locations of the plurality of gateways.

24. The non-transitory computer readable medium according to claim 20, wherein the adjusting comprises increasing the number of transmission attempts through the first gateway compared to the number of transmission attempts through the second gateway, as a time period or the number of times at which the first gateway provides connectivity to the first mobile node increases compared to a time period or the number of times at which the second gateway provides connectivity to the first mobile node.

25. The non-transitory computer readable medium according to claim 20, wherein the method further comprises exchanging the movement history of the first mobile node with another server.

26. The non-transitory computer readable medium according to claim 25, wherein the determining comprises determining the first gateway upon consideration being given to the movement history of the first mobile node received from the another server.

27. A non-transitory computer readable medium storing a program for causing a computer to perform a method performed by a server that relays a message addressed to a mobile node within a wireless ad-hoc network, the method comprising:
identifying a first mobile node designated as a final destination of a first message; and
determining, from among a plurality of gateways that provide connectivity with a network infrastructure to a plurality of wireless ad-hoc networks, a first gateway to which the first message is to be transferred, based on a movement history of the first mobile node, wherein
the movement history indicates a path through which a message originating from the first mobile node and arriving at the server has passed,
the determining comprises determining a gateway included in the path as the first gateway, and
the determining comprises determining the first gateway based on a relation between a current time, a current day of the week, or a current date and that when the message originating from the first mobile node has passed through one or some of the plurality of gateways.

* * * * *